United States Patent [19]

French

[11] 3,934,995
[45] Jan. 27, 1976

[54] METHOD OF CUTTING HOT GLASS BAND

[75] Inventor: Walter K. French, Montrose, N.Y.

[73] Assignee: The Seagrave Corporation, New York, N.Y.

[22] Filed: Feb. 27, 1975

[21] Appl. No.: 553,494

Related U.S. Application Data

[63] Continuation-in-part of Ser. No. 426,526, Dec. 20, 1973, Pat. No. 3,875,766, and a continuation-in-part of Ser. No. 470,815, May 17, 1974.

[52] U.S. Cl. .......................... 65/97; 65/70; 65/112
[51] Int. Cl.² ............................................. C03B 21/00
[58] Field of Search ......................... 65/70, 97, 112

[56] References Cited
UNITED STATES PATENTS

| | | | |
|---|---|---|---|
| 3,754,884 | 8/1973 | McDavid et al. | 65/97 |
| 3,875,766 | 4/1973 | French | 65/97 |
| 3,885,943 | 5/1975 | Chui | 65/97 |

*Primary Examiner*—Arthur D. Kellogg
*Attorney, Agent, or Firm*—Mark T. Basseches; Paula T. Basseches

[57] ABSTRACT

The present invention relates to a method for cutting discrete sheets from a band or ribbon of glass such as emerges from the final stages of a float line or other glass production system. In accordance with the invention, a selected portion of an advancing band of glass in which a cut is to be made, which band is at a temperature of about 1000°F or upward, and particularly in the range of about 1100° to 1250°F or more, is subjected to a moderate, controlled quench influence, scribed, and rapidly broken along the scribe line.

3 Claims, 1 Drawing Figure

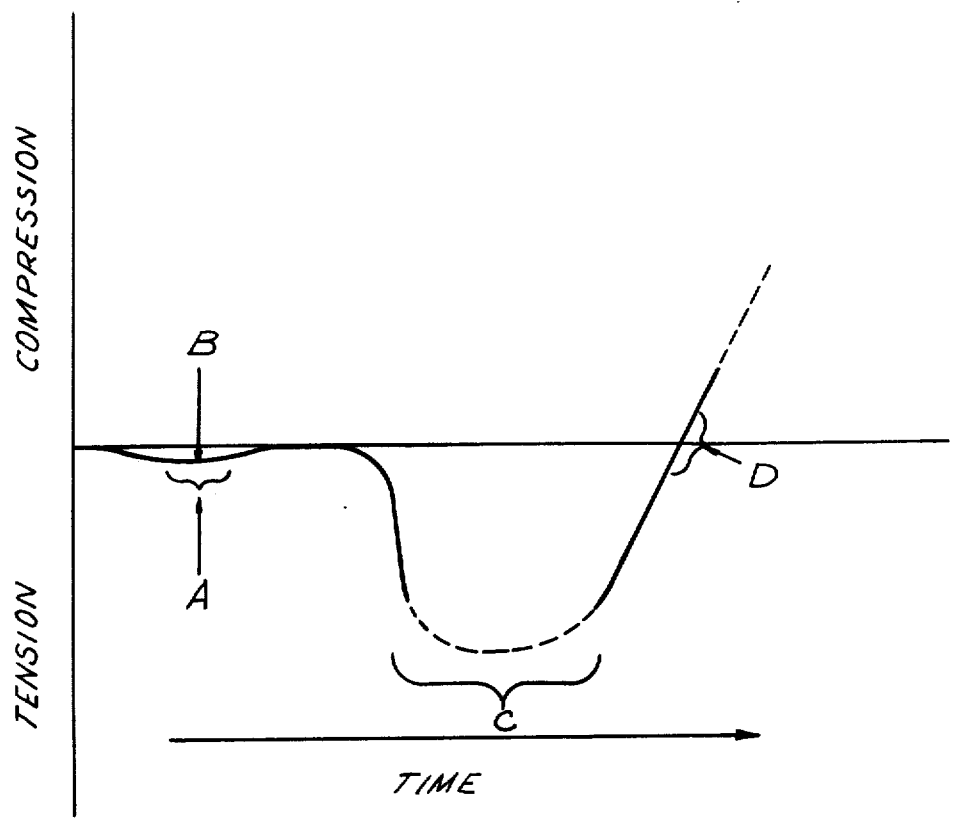

METHOD OF CUTTING HOT GLASS BAND

This application is a continuation-in-part of my applications Ser. No. 426,526, now U.S. Pat. No. 3,875,766 filed Dec. 20, 1973, entitled METHOD FOR THE DIRECT MANUFACTURE OF DISCRETE TEMPERED GLASS SHEETS, and Ser. No. 470,815, filed May 17, 1974, entitled METHOD FOR THE DIRECT MANUFACTURE OF TEMPERED GLASS SHEETS.

BACKGROUND OF THE INVENTION

1. Field of the Invention

The present invention is in the field of glass manufacture, being directed specifically to a method for forming a cut or cuts in a band of hot glass emerging from the terminal end of a manufacturing process, such as a float line.

2. The Prior Art

In my copending application Ser. No. 426,526, reference is made to a process for the direct manufacture of tempered glass sheets. The method of that application involves subjecting a continuously advancing glass band to a substantial quench of at least one of its surfaces, effecting a conventional scribing in the quenched area, breaking the glass along the scribe line by a rapid flexure, and continuing the quench process until tempering has been completed.

As is known, when glass at tempering temperatures, e.g. in the order of about 1250°F for a conventional soda-lime composition, is subjected to quenching influences, the surface areas are initially placed in substantial tension. Further in the quenching cycle, the tension in the surface areas is progressively reduced, and with the cooling and consequent shrinkage of the interior elements of the glass, the surfaces are placed under substantial compression.

The method of application Ser. No. 426,526 is predicated upon the discovery that during a quenching procedure incident to tempering, and particularly at that phase or range of the tempering procedure wherein the tension of the surface of the glass is reduced and the surface is about to enter or has just entered the compressive phase, the surface of the glass may be scribed and broken, and the resultant sheet obtained by continuing the quenching procedure will not evidence any of the tendencies to dice which would be experienced from an attempt to scribe and break a tempered glass sheet.

The method in accordance with application Ser. No. 426,526, in short, is directed broadly to the concept of cutting during the quench cycle, and in the discovery broadly that a glass sheet within the temperature range suitable for tempering may be broken by cooling a surface, scribing the cooled surface and breaking along the scribe while a substantial temperature differential exists within the sheet.

As hereinabove noted, the scoring and breaking in accordance with the described embodiments in application Ser. No. 426,526 are concluded to have been effected in the quenching process at that point or in that range when the cooled surface has already progressed through its major tension condition and is about to enter or has just entered a compression state or is at a null condition.

Without being bound by any theory, it is believed that the success of the procedure in the aforesaid application was predicated upon the fact that by cutting at the stage noted, the fissures in the surface resulting from scoring were not present at any time when the surface was in a state of high tension. Although such fissures may remain after cutting and breaking, they do not spread since they exist only in compression zones of the glass.

In contrast, conventional tempering of annealed glass requires that the edges of the sheet be ground to remove fissures which would spread when the surfaces are placed in tension in the course of quenching.

There may be mentioned, in addition to the prior art patents cited in the text of application Ser. No. 426,526, U.S. Pat. No. 3,754,884, This patent suggests that tempering may be effected, with the saving of some of the heat of melt, by reducing the temperature of a band of glass emerging from a melt to a uniform value below the temperature at which the glass is self-sustaining, such temperature being about the strain point of the glass, and cutting the glass at such uniform elevated temperature.

SUMMARY

The present invention is predicated on the discovery that a band of glass emerging from a melt at high temperatures may be cut into discrete sheets and may be subjected to edge trimming cuts by a method which does not necessitate reducing the temperature of the glass to the extent suggested in U.S. Pat. No. 3,754,884, or quenching the glass to a degree whereat the quenched surfaces have progressed through or substantially through the tension range, to the null or slight compression range.

More specifically, I have discovered that clean cuts may be formed in glass by scoring and breaking with the mean glass temperature substantially higher than heretofore considered possible, i.e. at a temperature well above the strain relief range, by a procedure which involves slightly chilling at least one surface of the glass which is to be cut at least in the area in which the cut is to be effected, to induce a slight tension in the chilled area, and scribing and rapidly breaking along the area which is chilled.

Unexpectedly I have discovered that glass at a uniform temperature of 1250°F or even higher may be cut by slightly chilling a surface of the glass, scribing the slightly chilled surface, and rapidly breaking along the scribe line. The chilling referred to is not sufficient to advance the surface through the high tension and then progressively lower tension, null or slight compression conditions incident to the fabrication of tempered glass. Rather, the slight chilling results in the production of a slight tension in the surface, which tension would greatly increase if the chilling were continued. During the initial period of slight chill or partial quench, if a scribe is run across the partially quenched zone, there will be formed fissures of a depth sufficient to permit the glass to be broken along the score line provided a sufficiently rapid stress is applied in registry with the score.

Additionally, I have discovered that by forming the scribe across a tension zone, the areas to either side of the scribe line tend to pull away or recede from the formed scribe, enabling the production of an accurate and well defined cut, notwithstanding the application of limited scribe pressures.

Cuts effected by scoring and breaking glass at room temperatures result in the formation of a so-called hackle zone at or adjacent the surface, the zone extending up to about one tenth of the thickness of the glass, depending upon the glass thickness and scribing procedure followed, and a so-called mirror or smooth zone below the hackle zone. The hackle zone is characterized by a series of interconnected but not necessarily perfectly aligned chips having radiating fissures therebelow, the mirror zone being essentially a perfectly flat, planar zone extending the remaining nine tenths or more of the glass thickness.

The practice of the procedure of the present invention likewise involves hackle and mirror zones, the hackle zone being of lesser depth and roughness and the mirror zone of greater thickness than observed in the comparable cutting of cold annealed glass.

In addition to the formation of a fine edge, the practice of the instant process is advantageous in that if the resultant sheets are to be subjected to further quenching as for tempering, the steps required for removal of remaining fissures are simplified.

By way of example, if the discrete sheets formed as a result of the procedure are annealed, cooled and are thereafter to be tempered, the amount of grinding necessary to remove the fissures is substantially reduced.

Similarly, if the sheets are to be tempered without cooling, i.e. by fire polishing of the edges, the amount of fire polishing required to prevent break-up of the subsequently tempered sheets is reduced.

Also, if cutting is effected at a sufficiently elevated temperature, or if the temperature of the severed sheets is thereafter elevated to quenching temperatures, the fissures, by reason of their small size, may heal themselves to an extent whereby the subsequent high tension formed in the hackle zone during quenching, will not cause the sheet to break up.

Accordingly, it is an object of the invention to provide a method of cutting hot glass which is a modification, variation, refinement or improvement of the method defined in my application Ser. No. 426,526.

It is a further object of the invention to provide a method of cutting glass bands emerging from a melt at elevated temperatures by quenching and subsequently scribing, which method does not involve quenching to an extent which produces substantial tension in the surface. Rather, quenching is carried out to an extent to induce only moderate tension in the surface.

A further object of the invention is the provision of a cutting procedure of the type described which may be carried out in glass bands at high temperatures without lowering the temperature of interior increments of the glass to the degree inherent in certain aspects of the procedure of my copending application Ser. No. 426,526.

To attain these objects and such further objects as may appear herein or be hereinafter pointed out, reference is made to the accompanying drawing, forming a part hereof, in which:

FIG. 1 is a graph diagrammatically illustrating the strain characteristics in the surface layer of a band of glass processed in accordance with the invention.

As conducive to an understanding of the present invention, there is shown in FIG. 1 a graph illustrating the strain characteristics inhering in the surface layer only of glass being processed, the glass being initially, e.g. at the intersection of the X and Y axes, at a temperature suitably high for tempering, e.g. about 1275°F for a conventional soda-lime formulation.

Glass in the area A has been subjected to a short period of moderate quench, the characteristics of which quench being more fully defined hereinafter, it being observed from FIG. 1 that the surface zone of the glass subjected to the quenching influence (e.g. a transverse band, if a transverse cut is to be made) being in a slight state of tension. If the glass in the condition of Zone A is at point B subjected to a rapid scoring and flexure about the score line, the glass will part cleanly on the formed score line. Thereafter, the separated glass increment may be processed in any desired manner.

Assuming the band to have been at an initial temperature of 1250°F or more, the heat extraction effected by the quench, especially if the same is not applied to the entire glass but only to a band or bands of the glass, is normally insufficient to reduce the temperature of the glass below that required for tempering. The glass thus may be tempered by quenching without further heating or, in the event that heat loss is sufficient to reduce the temperature of the glass below the temperatures needed for tempering, may be subjected to an additional heating step which will raise the glass temperature to a proper temperature level.

In the Zone C of FIG. 1, there is diagrammatically illustrated the tension forces developed in the surface layer as the result of the application of a full tempering quench. It will be observed that the tension forces existing in the surface layer increase rapidly during the initial stages of the quench and thereafter progressively reduce until the surface goes into compression.

In accordance with a form of practice of the method of application Ser. No. 426,526, cutting and breaking of the glass is believed in such case to have been effected at or near the range D where the surface has progressed beyond its point of maximum tension and is about to enter or has just entered into the compressive phase or, optimally, is at the null zone.

As more fully set forth in application Ser. No. 426,526, there are described various means for maintaining the glass in the Zone D to extend the time period during which cutting and breaking may successfully be effected, one such means including a progressive quench apparatus embodying an initial rapid quench, followed by a decreasing quench, followed further by an increasing quench. As an alternative described means for extending working time, the application suggests subjecting the glass to a source of homogeneous heat while quenching influences are applied to the glass.

The simultaneous homogeneous heating and quenching protracts the cutting period by maintaining the temperature differential between the external surface and the internal body of the glass since the homogeneous heat acts equally throughout the glass whereas the quench extracts heat preferentially at the surfaces.

Where cutting is effected in the Zone D, as per application Ser. No. 426,526, and the quench continued, the resultant glass is inevitably tempered glass or at least heat hardened glass wherein the surface is under compression and the interior in tension.

As will be appreciated from an inspection of FIG. 1, the cutting at point B in the procedure provides a substantial degree of flexibility in that the resultant cut glass may be annealed, resulting in the production of annealed sheets, or may be tempered, or may be bent.

It will be further understood that since the quenching influences applied in the area A are small, heat extracted from the glass body is relatively small. It will thus be understood that if the severed sheets are to be subjected to the formation of a series of cuts, additional minor quenching influences may be applied until all of the necessary cuts have been completed, without reducing the temperature to a value below the desired range.

It is feasible, where the initial temperature of the glass is sufficiently high, directly to temper without further heating of glass which has been cut in accordance with the invention.

In view of the relatively shallow nature of the fissures resulting from cutting in the Zone A, if the cut glass is permitted to soak, i.e. remain for a time period without additional heating or cooling, the heated interior of the glass during the soak period raises the temperature in the surface area and, hence, the relatively smaller hackle zone, to a degree sufficient to heal the fissures resulting from scoring, whereafter the cut sheets may be subjected to conventional quenching techniques, resulting in the direct production of tempered glass sheets.

The method in accordance with the present invention is particularly advantageous in the direct formation of tempered glass sheets where multiple cuts are to be effected and where difficulties are encountered in maintaining the glass in the Zone D for the period of time necessary to effect all of the cuts. In such instance, by repeated cycles of slight quenching, cutting and, if necessary, slight reheating, etc. as necessary for the formation of additional cuts, the major amount of heat energy present in the glass emerging from the melt is maintained.

The method in accordance with the present invention or in accordance with Ser. No. 426,526 is to be contrasted, for instance, with that of United States Patent No. 3,754,884 which mandates that cutting be effected after a substantial reduction of heat in the entire glass is accomplished, and which further mandates that the heat in the glass at the time of cutting be equal throughout, requiring the use of an annealing lehr. After the cutting in accordance with the noted patent, the glass must be reheated to tempering temperatures, involving further energy consumption.

In accordance with a preferred embodiment, a band of glass of one quarter inch thickness emerging from the melt at a temperature of about 1275°F is, for a period of approximately one quarter second, subjected to a quench consisting of air at ambient (approximately 75°F) temperatures. The quench employed in the instant embodiment has an average heat extraction capacity of about 5 BTU per hour per square foot for each degree Fahrenheit of temperature differential between the glass surface and the quench air medium.

Immediately after the quench, a score is effected on the quenched surface through the use of any conventional scoring implement, a preferred implement being a diamond or tungsten-carbide wheel. The implement is drawn rapidly across the surface at a speed of about six feet per second.

Immediately following scoring, the surface of the glass remote from the score is subjected, in the usual manner, to a shock or flexing force tending to deflect the glass increments to either side of the score line about the score line as a bending axis.

The band will be found to part cleanly about the score line.

It is important in accordance with the present procedure, especially where the same is carried out at elevated temperatures, that the score be rapidly formed and that breaking along the score line promptly follow completion of the score, since the fissures tend to heal in a short time span.

It is further found to be desirable in the practice of the present method that the flexing to effect the break be a sudden or rapid flexing since the glass, especially at the higher temperatures noted, is still susceptible of being bent or deformed and application of a relatively slow flexing force will effect such deformation rather than a clean break.

The procedure described has been successfully carried out on an experimental basis at even higher temperatures than those mentioned, and it is within the contemplation of the present invention to encompass cutting at such higher temperatures. Such cutting does, however, have the disadvantage that the scoring and the flexing necessary for breakage is quite likely to deform the edge portions adjacent the break. On the positive side, however, due to the relatively lower viscosity of the glass, it is feasible to effect a break using a rapid but very minor bending of the glass at the score line.

It will be readily recognized, as is the case with all glass manufacturing procedures, that a degree of adjustment in the treatment parameters is to be anticipated in order to set up a campaign for the processing of particular sizes and compositions of glass. Factors which must be considered include the temperature of the glass at the time when the cut is to be made, the chemical composition of the glass, the nature of the cutting implement employed, the scoring pressure, the dimensions and the thickness of the glass, length of cut, etc.

Where a cutting is effected at especially high temperatures, the amount of pressure exerted by the scoring implement should desirably be reduced to a relatively low value since in some cases a degree of deformation of the score line at the upper temperature range may be observed if undue pressure is applied to the scoring implement.

Broadly stated, the present invention is predicated upon the discovery that a glass band may be broken along a parting line by essentially conventional scoring and bending steps, even though the glass is at an extremely elevated mean temperature, if a surface of the glass is subjected to a quenching influence sufficient to place the surface in slight tension and if the thus formed tension zone is scored and broken rapidly. The tension zone created is substantially less than the experienced in the surface of glass in the initial stages of a conventional tempering quench, and it will be understood that the tension may, after cutting, be eliminated by the addition of minor amounts of heat or by a soaking of the glass in an environment not involving substantial heat extraction.

The invention further contemplates the cutting of a band of glass at temperatures sufficiently high for tempering, permitting the fissures resulting from cutting to heal, either through a soaking, heating, or other fire polishing step, and thereafter subjecting the discrete sheets formed as a result of cutting to a tempering quench.

Interestingly, if the glass is cut in accordance with the method of the present invention and immediately thereafter, e.g. without soaking or fire polishing, subjected to a tempering quench, an in ordinately high incidence of breakage occurs. It is believed that the breakage is the result of the existence of fissures at a time when high tension is present in the hackle zone as a result of the quenching.

It will be observed that the present invention involves a specific refinement of the generic concept disclosed in my copending application Ser. No. 426,526. In one aspect of the method of the aforesaid application, cutting is effected at an intermediate stage of the tempering quench at a point or range wherein a maximum temperature differential between quenched surface and interior, on the order of about 300°F is attained. In the method of the present invention, a substantially lower temperature differential of from about 10°F to about 50°F exists between the surface and the interior of the glass.

While the action of the cutting implement on the chilled tension zone has been referred to as "scoring", the precise mechanics resulting from the use of such implement are not fully known. Accordingly, the term "scoring" as employed herein and the action resulting from the use of the cutting implement on the tensioned glass surface and referred to as a "score" should not be construed as restricted to the conventionally understood meaning of such terms.

Numerous variations will occur to skilled workers in the art in the light of the instant disclosure. Accordingly, the present invention should be broadly construed within the scope of the appended claims.

Having thus described the invention and illustrated its use, what is claimed as new and is desired to be secured by Letters Patent is:

1. The method of making discrete glass sheets from a ribbon of glass proceeding from a melt, said glass being in the temperature range of from about 1000° to about 1300°F, which comprises the steps of subjecting at least a surface area of said band to a quenching influence in quantity sufficient to place the surface area in slight tension, said quench reducing the temperature of said surface area to a range about 50°F or less below the maximum temperature of the interior of said band, forming a score line across said chilled portion of said band and breaking said band on said score line promptly after the formation of said score line and before the fissures resulting from said score have healed.

2. The method in accordance with claim 1 which includes the step of causing at least the edge portion of said surface of said separated increment formed as a result of said scoring and breaking steps to become reheated for a period of time sufficient to heal the fissures formed as a result of said scoring and breaking steps, and thereafter subjecting said increment to a tempering quench.

3. The method in accordance with claim 2 wherein the initial temperature of said band is at least at the minimum temperature suitable for tempering the particular glass formulation treated at the time of said quench, and said reheating is effected by conduction of heat from internal components of said band.

* * * * *